(12) United States Patent
Chaturvedi et al.

(10) Patent No.: US 9,104,709 B2
(45) Date of Patent: *Aug. 11, 2015

(54) CLEANSING A DATABASE SYSTEM TO IMPROVE DATA QUALITY

(75) Inventors: Snigdha Chaturvedi, New Delhi (IN); Tanveer A Faruquie, New Delhi (IN); Hima P Karanam, New Delhi (IN); Mukesh K Mohania, Agra (IN); L Venkata Subramaniam, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/422,280

(22) Filed: Mar. 16, 2012

(65) Prior Publication Data

US 2012/0179658 A1    Jul. 12, 2012

Related U.S. Application Data

(63) Continuation of application No. 12/966,281, filed on Dec. 13, 2010.

(51) Int. Cl.
```
G06F 7/00       (2006.01)
G06F 17/00      (2006.01)
G06F 17/30      (2006.01)
```

(52) U.S. Cl.
CPC .... *G06F 17/30306* (2013.01); *G06F 17/30303* (2013.01); *G06F 17/30536* (2013.01)

(58) Field of Classification Search
CPC ............... G06F 17/30303; G06F 17/30306; H04L 1/00; H04L 1/0061; H04L 1/0072
USPC .............. 707/736, 752–753, 968, 999.007, 707/687–692
See application file for complete search history.

(56) References Cited

U.S. PATENT DOCUMENTS 6,523,019 B1    2/2003   Borthwick
7,505,868 B1 *  3/2009   Shan ............................ 702/182
(Continued)

FOREIGN PATENT DOCUMENTS

WO       2006113707      10/2006

OTHER PUBLICATIONS

Rahm et al., "Data Cleaning: Problems and Current Approaches", Quarterly Bulletin of the Computer Society of the IEEE Technical Committee on Data Engineering, The Committee, Washington, D.C., Dec. 1, 2000, pp. 1-11.*

(Continued)

*Primary Examiner* — Jason Liao
*Assistant Examiner* — Berhanu Mitiku
(74) *Attorney, Agent, or Firm* — Terry Carroll; Edell, Shapiro & Finnan, LLC (57) ABSTRACT

According to one embodiment of the present invention, a system controls cleansing of data within a database system, and comprises a computer system including at least one processor. The system receives a data set from the database system, and one or more features of the data set are selected for determining values for one or more characteristics of the selected features. The determined values are applied to a data quality estimation model to determine data quality estimates for the data set. Problematic data within the data set are identified based on the data quality estimates, where the cleansing is adjusted to accommodate the identified problematic data. Embodiments of the present invention further include a method and computer program product for controlling cleansing of data within a database system in substantially the same manner described above.

20 Claims, 9 Drawing Sheets

(56) References Cited

U.S. PATENT DOCUMENTS

| | | | |
|---|---|---|---|
| 7,516,128 B2* | 4/2009 | Colby et al. | 1/1 |
| 2004/0107202 A1 | 6/2004 | Burdick et al. | |
| 2004/0107205 A1 | 6/2004 | Burdick et al. | |
| 2004/0158562 A1 | 8/2004 | Caulfield et al. | |
| 2005/0131855 A1 | 6/2005 | Forman et al. | |
| 2006/0003328 A1* | 1/2006 | Grossberg et al. | 435/6 |
| 2006/0173924 A1 | 8/2006 | Wotton et al. | |
| 2008/0027958 A1* | 1/2008 | Kapoor et al. | 707/101 |
| 2008/0301016 A1* | 12/2008 | Durvasula et al. | 705/35 |
| 2010/0106724 A1 | 4/2010 | Anderson | |
| 2011/0138312 A1* | 6/2011 | Yeh et al. | 715/771 |
| 2012/0131022 A1* | 5/2012 | Uppala et al. | 707/752 |

OTHER PUBLICATIONS

Au et al. "A framework of irregularity enlightenment for data pre-processing in data mining", Annals of Operations Research Kuwer Academic Publishers, vol. 174, No. 1, Dec. 6, 2008, 20 pages.*

International Search Report and Written Opinion, PCT/EP2011/072187, Feb. 23, 2012, 15 pages.

Koh et al., "Correlation-Based Detection of Attribute Outliers", Apr. 9, 2007, Advances in Databases: Concepts, Systems and Applications; Lecture Notes in Computer Science, Springer-Verlag, Berlin Heidelberg, pp. 164-175.

Helena Galhardas, "Data Cleaning and Transformation Using the AJAX Framework", Generative and Transformational Techniques in Software Engineering Lecture Notes in Computer Science; LNCS, Springer, Berlin, DE, Jan. 1, 2006, pp. 327-343.

Maletic et al., "Data Cleansing: Beyond Integrity Analysis", Proceedings of the Conference on Information Quality, Massachusetts Institute of Technology, Boston, MA, Oct. 20-22, 2000, Jun. 23, 2000, pp. 1-10.

Ali et al., "A framework to implement Data Cleaning in Enterprise Data Warehouse for Robust Data Quality", Information and Emerging Technologies, 2010 International Conference, Jun. 14, 2010, pp. 1-6.

Muller et al., "Problems, Methods, and Challenges in Comprehensive Data Cleansing", www.dbis.informatik.hu-berlin.de/fileadmin/research/papers/tec hreports/2003-hub_ib_164-mueller.pdf retrieved Feb. 10, 2012, pp. 1-23.

Hao et al., "Research on Information Quality Driven Data Cleaning Framework", Future Information Technology and Management Engineering, Nov. 20, 2008, pp. 537-539.

Au et al., "A framework of irregularity enlightenment for data pre-processing in data mining", Annals of Operations Research, Kluwer Academic Publishers, vol. 174, No. 1, Dec. 6, 2008, 20 pages.

Amihai Motro et al., "Estimating the Quality of Databases", FQAS'98, LNAI 1495, pp. 298-307, 1998. Springer-Verlag Berlin Heidelberg 1998.

M. Scannapieco et al., "DL3: Comparative Analysis of the Proposed Methodologies for Measuring and Improving Data Quality and Description of an Integrated Proposal", Jan. 10, 2003.

J. Hipp et al., "Data Quality Mining Making a Virtue of Necessity", 2001.

L. Berti-Equille, "Measuring and Modelling Data Quality for Quality-Awareness in Data Mining", Studies in Computational Intellegence (SCI) 43, 101-126 (2007) www.springerlink.com.

Amihai Motro et al., "Estimating the Quality of Data in Relational Databases," DARPA grants; pp. 94-106.

* cited by examiner

TRAINING SET:

| META-FEATURE1 NUMERIC | META-FEATURE2 NUMERIC | META-FEATURE3 NUMERIC | META-FEATURE4 NUMERIC | META-FEATURE5 NUMERIC | META-FEATURE6 NUMERIC | META-FEATURE7 NUMERIC | META-FEATURE8 NUMERIC | META-FEATURE9 NUMERIC | META-FEATURE10 NUMERIC | META-FEATURE11 NUMERIC | DATA QUALITY NUMERIC |
|---|---|---|---|---|---|---|---|---|---|---|---|
| 5.053734 | 3.370177 | 0.694601 | 2.757663 | 0.536477 | 0.30275 | -0.148188 | 1.953249 | 0.994018 | 0.411658 | 0.040073 | 83.0721 |
| 5.387868 | 3.59729 | 0.62682 | 2.539447 | 0.536887 | 0.302759 | -0.149814 | 1.956023 | 0.993803 | 0.452206 | 0.025735 | 90.940171 |
| 5.04 | 2.574488 | 0.003843 | 2.106228 | 0.541994 | 0.308504 | -0.197219 | 1.987888 | 0.996382 | 0.561111 | 0.005556 | 87.223169 |
| 4.570838 | 2.332793 | -0.037887 | 1.915027 | 0.54031 | 0.305435 | -0.17672 | 1.97976 | 0.994207 | 0.559462 | 0.007239 | 94.006849 |
| 4.547872 | 2.458353 | 0.17235 | 1.86896 | 0.540957 | 0.306629 | -0.184718 | 1.982999 | 0.993925 | 0.547872 | 0.020213 | 91.055456 |
| 4.791938 | 1.989788 | -0.435811 | 2.324961 | 0.546667 | 0.31609 | -0.249148 | 2.008004 | 0.995983 | 0.557867 | 0.014304 | 90.947368 |
| 5.011775 | 2.90011 | 0.582182 | 2.793496 | 0.534524 | 0.300465 | -0.12956 | 1.940166 | 0.994839 | 0.50799 | 0.053827 | 83.516484 |
| 5.080236 | 3.045357 | 0.628531 | 2.777028 | 0.534762 | 0.300368 | -0.129868 | 1.941509 | 0.994677 | 0.523649 | 0.049831 | 83.602151 |
| 6.603214 | 3.32922 | -0.040342 | 2.025677 | 0.545913 | 0.312674 | -0.233527 | 2.012941 | 0.996127 | 0.493201 | 0.009889 | 85.330579 |
| 4.531797 | 2.318733 | 0.377239 | 2.915683 | 0.537095 | 0.302643 | -0.150183 | 1.95767 | 0.995578 | 0.509677 | 0.020276 | 88.888889 |
| 4.639208 | 2.46503 | 0.372318 | 2.875627 | 0.540537 | 0.306484 | -0.182283 | 1.979961 | 0.994702 | 0.497393 | 0.008342 | 88.132635 |
| 4.763464 | 2.441929 | 0.350346 | 3.04652 | 0.540787 | 0.307082 | -0.186013 | 1.981167 | .09895241 | 0.523759 | 0.01056 | 90.199637 |
| 4.604478 | 2.403364 | 0.3596 | 3.143779 | 0.541181 | 0.307248 | -0.188567 | 1.984199 | 0.995065 | 0.509595 | 0.015991 | 90.181818 |
| 4.792683 | 2.410073 | 0.333429 | 3.067978 | 0.539615 | 0.305865 | -0.175141 | 1.973331 | 0.995612 | 0.515244 | 0.006098 | 80.704698 |
| 5.137056 | 2.662077 | 0.480593 | 2.542308 | 0.546034 | 0.313856 | -0.237336 | 2.008592 | 0.993202 | 0.441624 | 0.008883 | 94.69697 |
| 4.486425 | 2.263712 | 0.213465 | 2.469729 | 0.543106 | 0.30919 | -0.206938 | 1.996951 | 0.994636 | 0.531674 | 0.0 | 90.833333 |
| 4.283126 | 2.286512 | 0.241164 | 2.280842 | 0.542438 | 0.310157 | -0.20553 | 1.987626 | 0.99472 | 0.497169 | 0.0 | 89.868668 |
| 4.918691 | 2.528639 | 0.281479 | 2.269619 | 0.540418 | 0.307534 | -0.184963 | 1.975237 | 0.995429 | 0.540655 | 0.002112 | 92.037037 |
| 5.031189 | 2.37158 | 0.337386 | 3.352856 | 0.538575 | 0.304337 | -0.16359 | 1.966324 | 0.99569 | 0.552632 | 0.001949 | 92.857143 |
| 4.204272 | 2.410116 | 0.666627 | 3.875145 | 0.524306 | 0.293602 | -0.059434 | 1.871188 | 0.996406 | 0.468784 | 0.222892 | 75.052411 |

FIG.6A

REGRESSION FUNCTION:

(NORMALIZED) DATA QUALITY =

$\underbrace{\begin{aligned}&\phantom{+\ }0.0992 * \text{(NORMALIZED) META-FEATURE1}\\&+ -0.267 * \text{(NORMALIZED) META-FEATURE2}\\&+\phantom{-}0.0739 * \text{(NORMALIZED) META-FEATURE3}\\&+\phantom{-}0.1798 * \text{(NORMALIZED) META-FEATURE4}\\&+\phantom{-}0.1348 * \text{(NORMALIZED) META-FEATURE5}\\&+\phantom{-}0.0411 * \text{(NORMALIZED) META-FEATURE6}\\&+ -0.0854 * \text{(NORMALIZED) META-FEATURE7}\\&+\phantom{-}0.1606 * \text{(NORMALIZED) META-FEATURE8}\\&+ -0.3558 * \text{(NORMALIZED) META-FEATURE9}\\&+\phantom{-}0.2677 * \text{(NORMALIZED) META-FEATURE10}\\&+ -0.3277 * \text{(NORMALIZED) META-FEATURE11}\end{aligned}}_{\beta}$

EXAMPLE SET:

| META-FEATURE1 NUMERIC | META-FEATURE2 NUMERIC | META-FEATURE3 NUMERIC | META-FEATURE4 NUMERIC | META-FEATURE5 NUMERIC | META-FEATURE6 NUMERIC | META-FEATURE7 NUMERIC | META-FEATURE8 NUMERIC | META-FEATURE9 NUMERIC | META-FEATURE10 NUMERIC | META-FEATURE11 NUMERIC | DATA QUALITY NUMERIC |
|---|---|---|---|---|---|---|---|---|---|---|---|
| 4.051302 | 1.89029 | 0.180237 | 2.624911 | 0.533109 | 0.298659 | -0.114553 | 1.928717 | 0.995773 | 0.498027 | 0.009471 | |
| 4.815648 | 2.368945 | 0.240033 | 2.833463 | 0.541313 | 0.307435 | -0.189477 | 1.984333 | .099491 | 0.50268 | 0.012862 | |
| 4.331536 | 2.405838 | 0.617459 | 3.878503 | 0.525837 | 0.294441 | -0.068474 | 1.880887 | 0.996647 | 0.478799 | 0.262073 | |

FIG.6C

PREDICTIONS ON EXAMPLE SET USING THE REGRESSION FUNCTION:

| META-FEATURE1 NUMERIC | META-FEATURE2 NUMERIC | META-FEATURE3 NUMERIC | META-FEATURE4 NUMERIC | META-FEATURE5 NUMERIC | META-FEATURE6 NUMERIC | META-FEATURE7 NUMERIC | META-FEATURE8 NUMERIC | META-FEATURE9 NUMERIC | META-FEATURE10 NUMERIC | META-FEATURE11 NUMERIC | DATA QUALITY NUMERIC |
|---|---|---|---|---|---|---|---|---|---|---|---|
| 4.051302 | 1.89029 | 0.180237 | 2.624911 | 0.533109 | 0.298659 | -0.114553 | 1.928717 | 0.995773 | 0.498027 | 0.009471 | 85.334 |
| 4.815648 | 2.368945 | 0.240033 | 2.833463 | 0.541313 | 0.307435 | -0.189477 | 1.984333 | .099491 | .50268 | 0.012862 | 89.973 |
| 4.331567 | 2.405838 | 0.617459 | 3.878503 | 0.525837 | 0.294441 | -0.068474 | 1.880887 | 0.996647 | 0.478799 | 0.262073 | 74.283 |

GOOD DATA QUALITY GROUPS (85.334% AND 89.973%)

POOR DATA QUALITY GROUP (74.283%)

FIG.6D

CLEANSING A DATABASE SYSTEM TO IMPROVE DATA QUALITY

CROSS-REFERENCE TO RELATED APPLICATIONS

This application is a continuation of U.S. patent application Ser. No. 12/966,281, entitled "Cleansing a Database System to Improve Data Quality" and filed Dec. 13, 2010, the disclosure of which is incorporated herein by reference in its entirety.

BACKGROUND

1. Technical Field

The present invention relates to database systems, and more specifically, to cleansing data within a database system by measuring the quality of data to identify low quality data within a collection of data records and adjusting the cleansing process based on the identified low quality data.

2. Discussion of the Related Art

Data quality refers to characteristics of data that render the data appropriate for a specific use (e.g., the state of completeness, validity, consistency, integrity, timeliness, accuracy, etc.). Data characteristics indicating low or poor data quality include incomplete data, wrong data, and inconsistent data. Data quality is a major issue for large database systems. For example, when data sizes include several million records, even a low percentage (i.e., one percent) of low quality data may result in a few hundred thousand erroneous records. The low quality data causes significant economical losses since these data quality issues involve costly steps to correct.

BRIEF SUMMARY

According to one embodiment of the present invention, a system controls cleansing of data within a database system, and comprises a computer system including at least one processor. The system receives a data set from the database system, and one or more features of the data set are selected for determining values for one or more characteristics of the selected features. The determined values are applied to a data quality estimation model to determine data quality estimates for the data set. Problematic data within the data set are identified based on the data quality estimates, where the cleansing is adjusted to accommodate the identified problematic data. Embodiments of the present invention further include a method and computer program product for controlling cleansing of data within a database system in substantially the same manner described above.

BRIEF DESCRIPTION OF THE SEVERAL VIEWS OF THE DRAWINGS

FIG. 6A illustrates an example training set for a regression model employed to estimate data quality according to an embodiment of the present invention.

DETAILED DESCRIPTION

Present invention embodiments estimate quality of data for a cleansing process within a database system, where the data is initially formed into groups or subsets. A regression model is utilized to determine the data quality of the groups, where the regression model may learn accuracies of individual data fields. The regression model may further learn from past performance on different data sets to predict data quality on a new data set. The quality estimation is performed without costly manual labeling of the data.

The groups are ranked based on estimated data quality, and groups (or specific data fields) of low data quality may be identified. Rules for standardizing or other processing of data during the cleansing process may be modified or created based on the lowest quality groups (or fields). This improves standardization performance by focusing the effort to the problematic data, and enhances the accuracy of the cleansing rules. The low quality or noisy data points of the identified groups are removed for matching and linking phases of the cleansing process. This improves matching accuracy and linking performance by reducing confusion.

Figure 1:
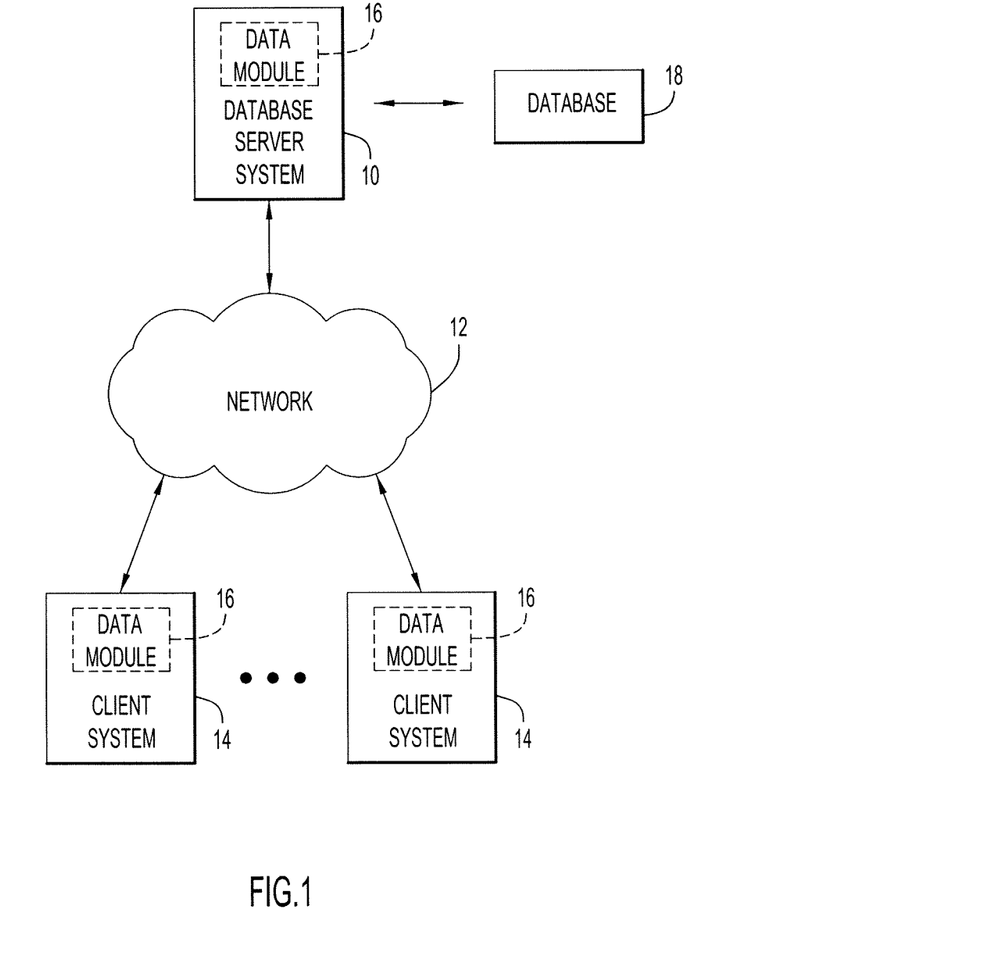
FIG. 1 is a diagrammatic illustration of an example computing environment for use with an embodiment of the present invention.

An example environment for use with present invention embodiments is illustrated in FIG. 1. Specifically, the environment includes one or more database or other server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to submit database or other queries to server systems 10 to retrieve information from a database system 18 for various applications. The server systems include a data module 16 to analyze and cleanse the data within database system 18. The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired data and analysis (e.g., the type of analysis or cleansing and corresponding parameters, cleansing rule modifications or adjustments, etc.), and may provide reports including analysis results (e.g., data quality and other values, data groups identified with low quality data, etc.).

Server systems 10 and client systems 14 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, analysis module, browser/interface software, etc.). In addition, data module 16 may include one or more modules or units to perform the various functions described below (e.g., cleansing data within database system 18, etc.), and may be implemented by any combination of any quantity of software and/or hardware modules or units.

Alternatively, one or more client systems 14 may analyze and cleanse data when operating as a stand-alone unit. In a stand-alone mode of operation, the client system stores or has access to the data, and includes data module 16 to analyze and cleanse the data. The graphical user (e.g., GUI, etc.) or other interface (e.g., command line prompts, menu screens, etc.) solicits information from a corresponding user pertaining to the desired data and analysis (e.g., the type of analysis or cleansing and corresponding parameters, cleansing rule modifications or adjustments, etc.), and may provide reports including analysis results (e.g., data quality and other values, data groups identified with low quality data, etc.).

Figure 2:
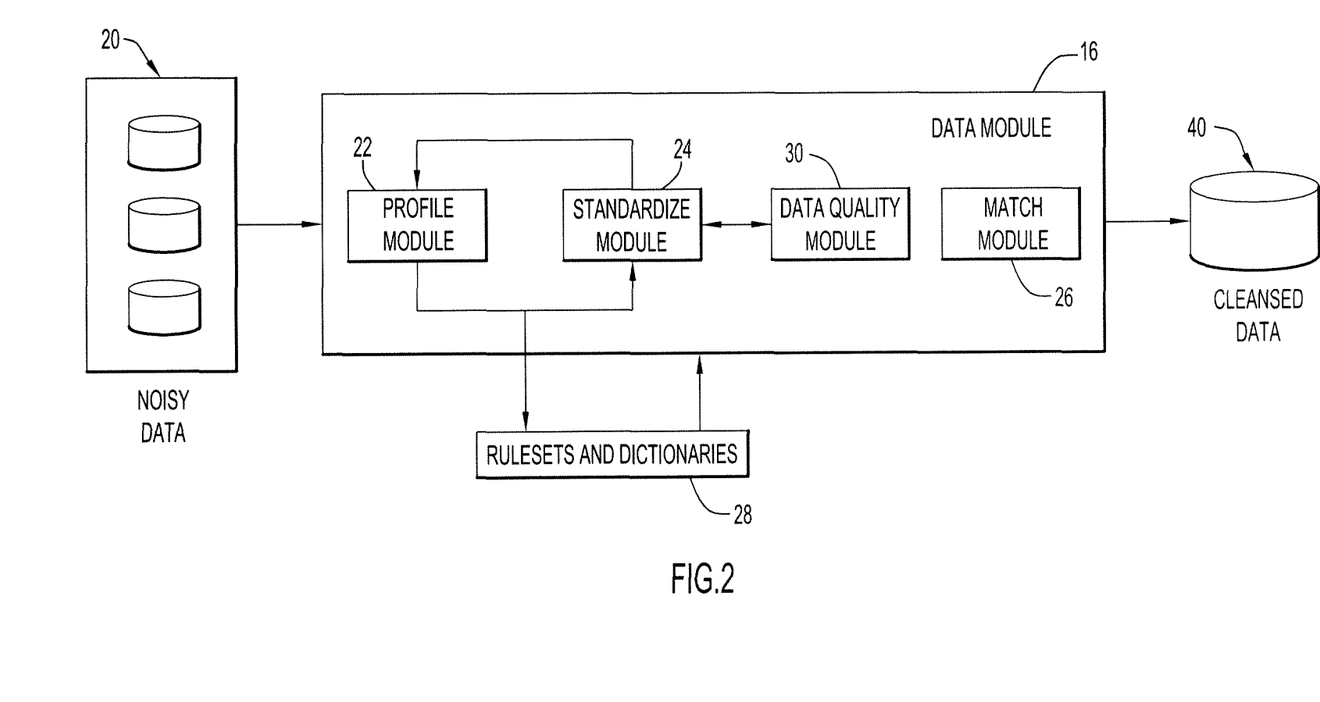
FIG. 2 is a block diagram of a data module for cleansing data of a database system according to an embodiment of the present invention.

Data module 16 (e.g., via server system 10 and/or client system 14) analyzes and cleanses data within database system 18 or other storage device as illustrated in FIG. 2. Specifically, data module 16 includes a profile module 22, a standardize module 24, a match module 26, and a data quality module 30. Profile module 22 assesses the data to understand the quality challenges, while standardize module 24 implements a business rules engine that ensures data conforms to quality or standardization rules (e.g., to improve data accuracy, consistency, etc.). Match module 26 employs rules to identify and match duplicate data. Cleansing rules (e.g., business (e.g., quality or standardization) rules, matching rules, and other rules for the cleansing process) and data dictionaries are stored in a storage unit 28.

Data 20 from database system 18 (FIG. 1) or other source is received by data module 16 for analysis and cleansing. The data is analyzed by profile module 22 and standardized by standardize module 24 in accordance with standardization and/or other rules from storage unit 28. For example, data in the form of an address may be standardized into various fields (e.g., Door No., Landmark type, Landmark Name, Locality, City, etc.) to provide consistency for the data and enable comparisons within corresponding data portions. The standardized data is processed by match module 26 to link data and identify duplicates. Data resulting from the processing is provided as cleansed data 40.

Figure 3:
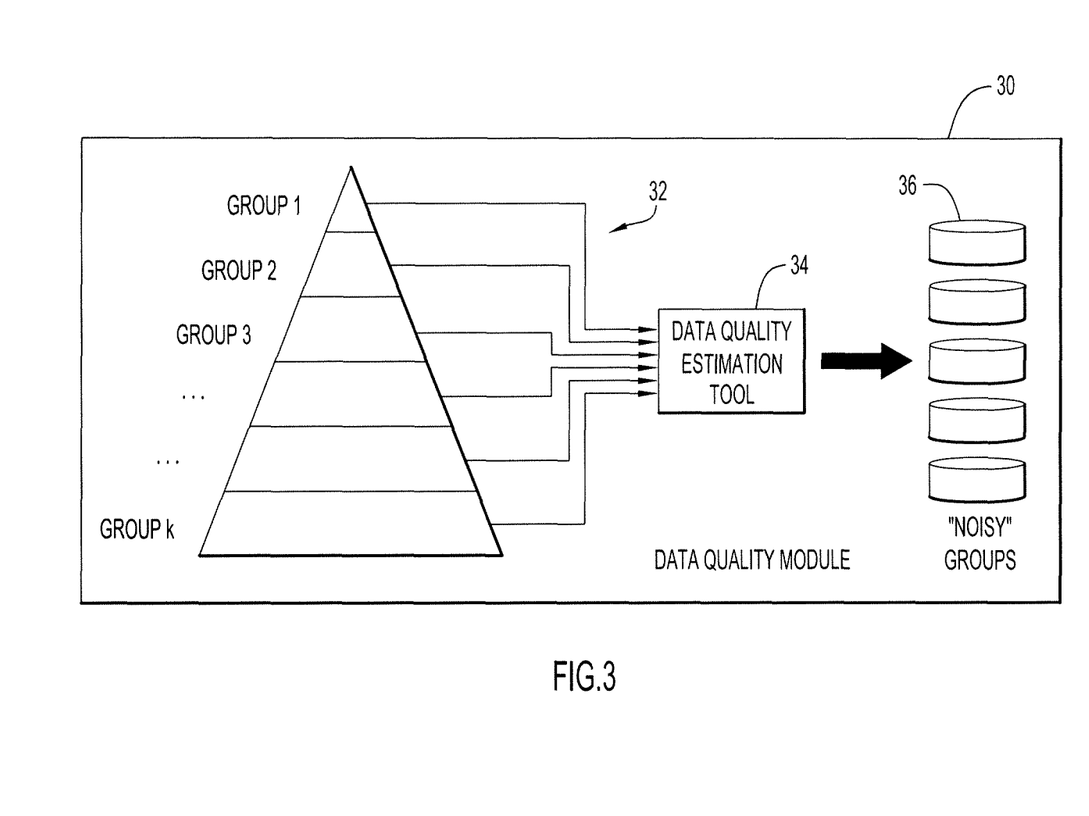
FIG. 3 is a diagrammatic illustration of a data quality module of the data module of FIG. 2 for determining data quality according to an embodiment of the present invention.

Data quality module 30 analyzes data to estimate data quality for adjusting the cleansing processing as illustrated in FIG. 3. Initially, a data set is partitioned into one or more data groups 32, each preferably of a fixed size as discussed below. Data quality module 30 includes a data quality estimation tool 34 to process data groups 32 and provide data quality estimates or values for each of these groups. The data quality module further identifies one or more groups 32 with the lowest data quality estimates or values and indicates these data groups as resulting data groups 36. Standardization and/ or other cleansing rules within storage unit 28 are modified based on the analysis to focus on resulting groups 36 containing the low quality data, thereby enhancing the cleansing process. However, any quantity of any rules within the storage unit may be modified, and/or any quantity of any rules may be created, to enhance the cleansing process based on the identified low quality data. Thus, data quality module 30 basically serves to implement a feedback loop to identify low quality data based on data quality estimates and adjust the cleansing process accordingly. The data quality module may monitor the quality of data during the cleansing process, or after a cleansing process has been performed (e.g., analyze recently cleansed data, etc.).

Figure 4:
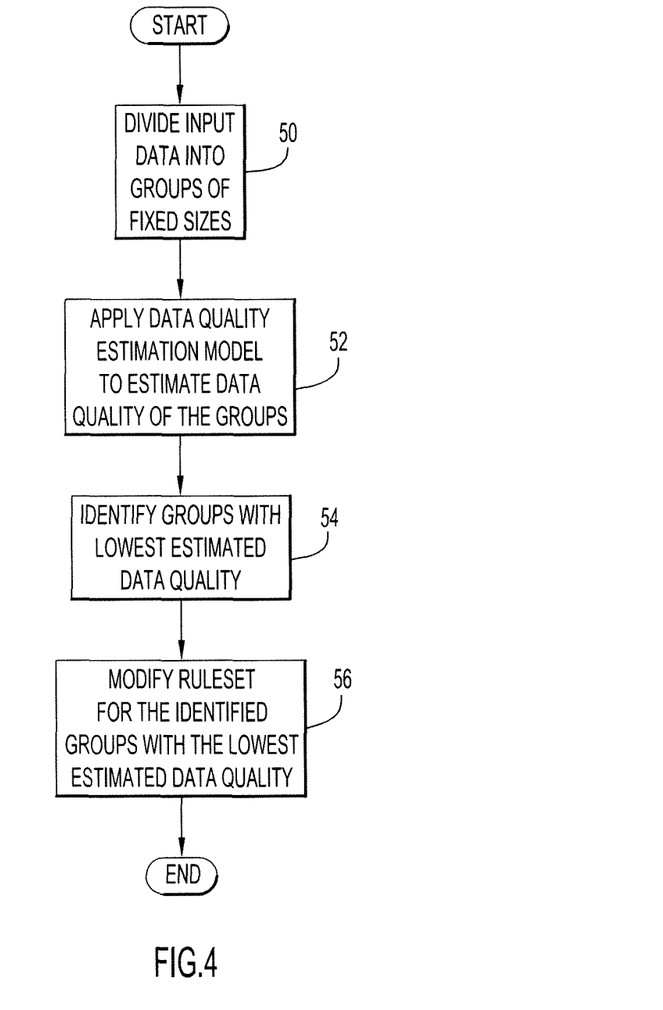
FIG. 4 is a procedural flow chart illustrating the manner in which the cleansing process is adjusted based on data quality within a database system according to an embodiment of the present invention.

The manner in which data quality module 30 (e.g., via server system 10 and/or client system 14) analyzes the data for data quality is illustrated in FIG. 4. Specifically, a data set is initially received and formed into data groups 32 (FIG. 3) of fixed sizes at step 50. This may be accomplished by sorting and arranging the received data with similar data positioned adjacent each other. For example, data in the form of addresses may be sorted based on the length of the address and the portions or tokens that were not able to be handled during the cleansing process (e.g., profile module 22, standardize module 24, and/or match module 26). In this case, longer addresses are expected to contain more entities and, therefore, be difficult to segment or standardize during cleansing. Similarly, addresses with several unhandled portions are expected to have increased difficulty during cleansing. Thus, data expected to be problematic are positioned adjacent each other for placement within the same data group. This enables each data group to contain data of relatively consistent data quality, thereby enabling the data quality estimates or values to vary across the data groups 32 and identify the one or more resulting groups 36 with problematic data.

Once the data is sorted, the sorted data is partitioned into groups 32 of fixed sizes. The size of the groups may vary according to the desired cleansing for an application. For example, larger group sizes may provide greater cleansing (e.g., due to cleansing rule adjustments accommodating a greater amount of problematic data being contained within a data group identified as having low data quality), but tend to increase difficulty in formulating cleansing rule adjustments since additional data points need to be considered.

Figure 5:
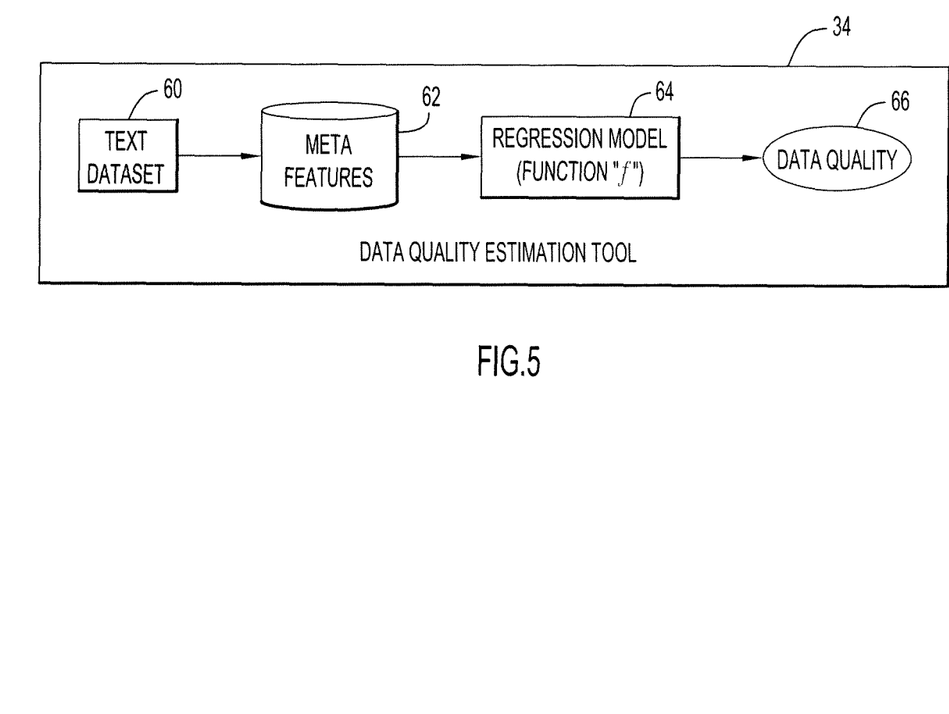
FIG. 5 is a diagrammatic illustration of a data quality estimation tool of the data quality module of FIG. 3 for estimating the data quality according to an embodiment of the present invention.

Data groups 32 are applied to a data quality estimation model (e.g., implemented by data quality estimation tool 34) to estimate the data quality of the data groups at step 52. Referring to FIG. 5, data quality estimation tool 34 receives a data group 60 of text or other data (e.g., corresponding to a data group 32), and characterizes the data group based on a set of meta-features 62. For example, various features for each token (e.g., word) of a data group are extracted (e.g., length of the token, the position of the token in the data, types of characters, presence of the data in a training dictionary, etc.). The data group is categorized by a set of meta-features that capture the distribution characteristics of the token features (e.g., mean length, standard deviation of length, etc.). The meta-features may vary based on the data, and are selected to be suitable for a particular application.

An example data group may include the following addresses:
1) 124, Vasant Kunj, New Delhi; and
2) 13/4 Adarsh Colony, Mathura, 221089.

The features extracted from the data group may include, by way of example, the length of the token (e.g., a numeric value) and presence of the token in a dictionary (e.g., a binary value) as illustrated by Table I below.

TABLE I

| Token | Length | Presence In Dictionary |
|---|---|---|
| 124 | 3 | No |
| Vasant | 6 | No |
| Kunj | 4 | No |
| New | 3 | Yes |
| Delhi | 5 | Yes |
| 13/4 | 3 | No |
| Adarsh | 6 | No |
| Colony | 6 | No |
| Mathura | 7 | Yes |
| 221089 | 6 | No |

The meta-features for the features extracted from the example data group are shown, by way of example, in Table II below. The meta-features for the length of token feature may include, by way of example, mean length, standard deviation of the lengths, skewness of the lengths and kurtosis of the lengths, while the meta-features for the presence in the dictionary feature may include, by way of example, the fraction of tokens present in the dictionary.

TABLE II

| Group | Mean Length | Std - Length | Skewness-Length | Kurtosis - Length | Fraction of Tokens Present in Dictionary |
|---|---|---|---|---|---|
| Example Group | 4.9 | 1.5239 | −0.2224 | 1.4894 | 0.3 (3/10) |

The data quality estimate is determined as a function of the meta-features. A regression model or function 64 is employed to determine data quality estimate or value 66. The regression model or function is generally of the form:

$$y_i = \beta_0 + \beta_1 x_{1i} + \ldots + \beta_p x_{pi} + \epsilon_i,$$

where i=1 to N (the number of data groups), p=1 to Z (the number of meta-features), $y_i$ represents the data quality estimate or value for data group 'i', $x_1$ to $x_p$ represent the meta-features, $\beta$ represents parameters for the regression model, and $\epsilon$ represents an error term.

Figure 6B:
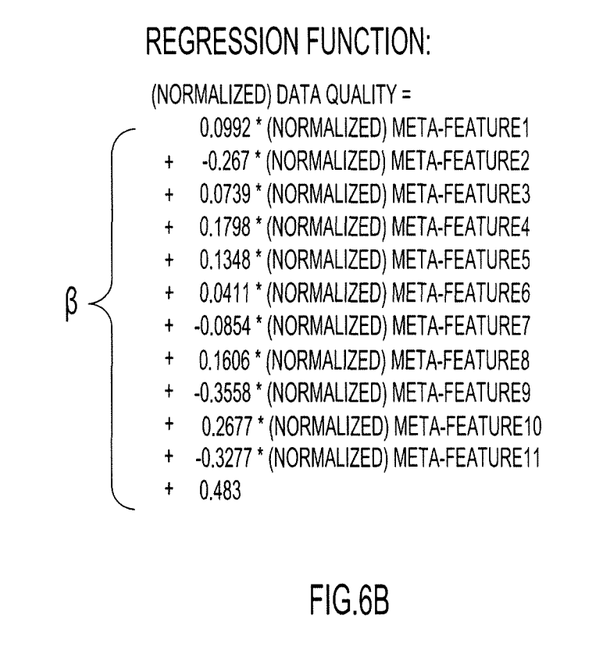
FIG. 6B illustrates an example of a regression model trained with the training set of FIG. 6A.

The regression model is trained with one or more tagged or particular data groups (e.g., data groups where the data quality is known) to learn the data quality function for determining a data quality estimate. An example training set for training a regression model to determine data quality is illustrated in FIG. 6A. In this example case, the training set includes eleven numeric meta-features (e.g., labeled Meta-feature 1 to Meta-feature 11 as viewed in FIG. 6A), and a known data quality value for each data group. The regression model is trained by applying the training set to determine the parameter values $\beta$ for the regression model. In other words, the values for the meta-features of each data group are utilized to determine the parameter values $\beta$ producing the corresponding known data quality value for that data group. The determined parameters for each data group may be analyzed via conventional or other techniques to arrive at a resulting (or best fit) parameter set that produces values closest to the known data quality values for each of the data groups in the training set. The resulting parameter set defines the regression model to predict or estimate data quality values. The resulting parameters and regression model are saved for subsequent use to determine data quality values for data groups being cleansed. An example regression model (including the parameters $\beta$) derived from the training set of FIG. 6A is illustrated in FIG. 6B.

Figure 6C:
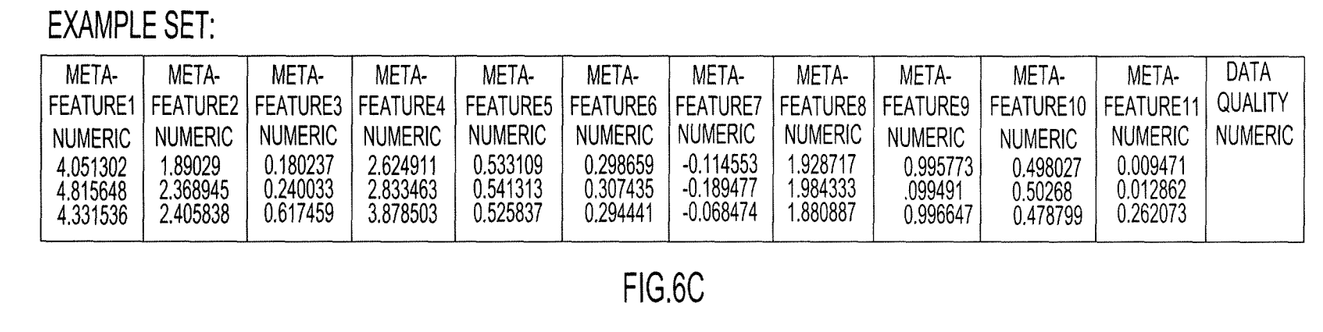
FIG. 6C illustrates an example data set for the regression model of FIG. 6B to estimate data quality according to an embodiment of the present invention.
Figure 6D:
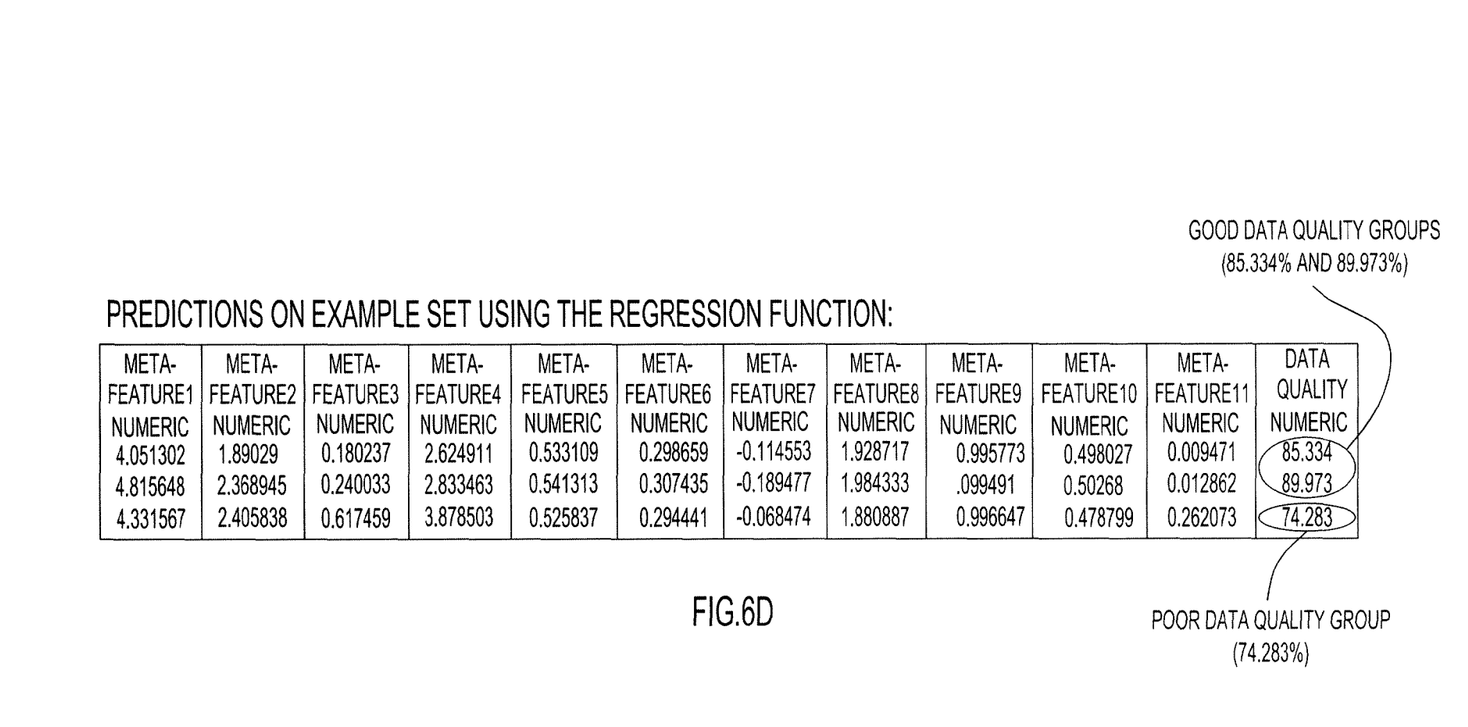
FIG. 6D illustrates example data quality estimates for the example data set of FIG. 6C determined by the regression model of FIG. 6B in accordance with an embodiment of the present invention.

Once the regression model is trained and saved, the regression model may subsequently be applied to each of data groups 32 to determine the data quality values or estimates for that group. An example set of data for Meta-feature 1 to Meta-feature 11 is illustrated in FIG. 6C. The results of applying this example set to the regression model of FIG. 6B are illustrated in FIG. 6D.

Referring back to FIG. 4, once the data quality estimates are determined for each data group 32 by regression model 64, one or more data groups 32 with the lowest data quality estimates or values are identified as resulting groups 36 (FIG. 3) at step 54. For example, the third data group in the example results of FIG. 6D includes the lowest data quality value, thereby indicating a data group with a low data quality. One or more thresholds may be utilized for the data quality values to indicate groups with good or poor data quality in order to control the cleansing. For example, a data group 32 with a data quality estimate or value above a threshold may be considered to be of sufficient data quality even though that data group may have the lowest data quality value. In this case, the data set is deemed satisfactory and no cleansing rule adjustments should be needed. Further, a data group 32 with a data quality estimate or value below a threshold may be considered to be of insufficient data quality even though that group may have the highest data quality value. In this case, the data set is deemed unsatisfactory and cleansing rule adjustments should be implemented.

Once one or more resulting groups 36 with low quality data are identified, the standardization and/or other cleansing rules for data module 16 within storage unit 28 are modified to accommodate the resulting groups of low quality data at step 56 (FIG. 4) in order to enhance the cleansing process. The rule adjustments may be performed for one or more rules automatically by data quality module 30, or manually (e.g., via the user interface of client systems 14) based on the data within the identified data groups. However, any quantity of any rules within the storage unit may be modified, and/or any quantity of any rules may be created, to enhance the cleansing process based on the identified low quality data.

The data quality estimates or values may be determined in substantially the same manner described above for one or more specific fields within a data set (e.g., extract features and meta-features for the one or more fields, apply the meta-features to a regression model to determine a data quality estimate for the one or more fields, identify the fields with the lowest data quality based on the data quality estimates, etc.) to identify data fields with problematic data and adjust standardization or other rules accordingly.

It will be appreciated that the embodiments described above and illustrated in the drawings represent only a few of the many ways of implementing embodiments for cleansing a database system to improve data quality.

The topology or environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., browser software, communications software, server software, cleansing and data quality analysis software, etc.). These systems may include any types of monitors and input devices (e.g., keyboard, mouse, voice recognition, etc.) to enter and/or view information.

It is to be understood that the software (e.g., data module, profile module, standardize module, match module, data quality module, data quality estimation tool, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., data module, profile module, standardize module, match module, data quality module, data quality estimation tool, etc.) may be available on a recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data, regression model and corresponding parameters, rules, etc.). The database system may be implemented by any number of any conventional or other databases, data stores or storage structures (e.g., files, databases, data structures, data or other repositories, etc.) to store information (e.g., data, regression model and corresponding parameters, rules, etc.). The database system may be included within or coupled to the server and/or client systems. The database systems and/or storage structures may be remote from or local to the computer or other processing systems, and may store any desired data (e.g., rules, regression model and corresponding parameters, data to be analyzed, etc.).

Present invention embodiments may be utilized for determining the data quality of and/or cleansing any types of data (e.g., boolean, character, alphanumeric, symbols, etc.) representing any information (e.g., names, addresses, codes, various numeric numbers (e.g., credit card, social security, PINs, currency or dollar amounts, etc.)). Further, present invention embodiments may be utilized for determining the data quality of and/or cleansing data from any types of storage units, systems or devices (e.g., databases, files, memory devices, data structures, processing devices, various types of stationary or mobile computer or processing systems or devices, etc.).

The data set analyzed for data quality may be of any size, and include any type of data (e.g., boolean, character, alphanumeric, numeric, symbols, etc.) representing any information (e.g., names, addresses, codes, various numeric numbers (e.g., credit card, social security, PINs, currency or dollar amounts, etc.)). The data may be partitioned into any quantity of groups, each of any desired size. The groups may be formed based on any suitable criteria for similarity (e.g., length of tokens, data type of tokens, etc.).

Any desired quantity or type of features or characteristics may be selected for the data set (e.g., length of token, type of token, etc.), where any quantity of any type of meta-features (e.g., any statistical characteristics of the selected features, location of storage, etc.) may be utilized for the data quality estimate. The features and meta-features may be represented by any type of values (e.g., boolean, alphanumeric, numeric, character, symbol, etc.).

The regression model may employ any type of regression (e.g., linear, non-linear, etc.) or other model or function to determine data quality. The regression model may be trained utilizing any quantity of data for a training set to determine model parameters. The regression model may be generated and trained on any suitable computer or processing system (e.g., including server systems 10 and/or client systems 14). The regression model may utilize any conventional best fit or other techniques to determine the model parameters. The regression model may employ any quantity of meta-features and corresponding parameters. The model parameter and data quality values may be in any desired value range.

The data quality estimate or value may be of any desired value, may include any type of value (e.g., numeric, character, boolean, alphanumeric, etc.), and may be within any desired value range. Problematic data may be identified by data with a data quality value in any desired range. For example, a low or high data quality value may indicate problematic data (depending upon the particular regression model employed). One or more thresholds may be employed and set to any desired values to indicate any degree of data quality (e.g., high, low, satisfactory, unsatisfactory, etc.). Problematic data may be identified based on any desired criteria (e.g., highest, lowest, etc.) for the data quality estimates, where one or more data quality estimates (e.g., for individual fields, etc.) may be combined in any fashion to provide a data quality estimate for any amount of data. Any number of data groups or fields may be identified as containing problematic data. Alternatively, present invention embodiments may identify any quantity of groups or fields with satisfactory data quality, where one or more of the remaining groups are considered to contain problematic data.

Any quantity of any types of data cleansing or other rules may be created or modified in any manner in accordance with the data quality analysis to adjust the cleansing process (e.g., rule parameters may be modified, rule logic may be modified, etc.). The rule modifications or creations may consider any quantity of identified groups or fields. The rule modifications and/or creations may be performed manually, or automatically via the data quality module.

The present invention embodiments may employ any number of any type of user interface (e.g., Graphical User Interface (GUI), command-line, prompt, etc.) for obtaining or providing information (e.g., obtaining information for the desired analysis or cleansing to be performed, rule modification and/or creation, providing the report, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion (e.g., pertaining to identified groups or fields, pertaining to the data quality estimates, pertaining to the rules, rule modifications and/or rule creations, etc.). The report may be configurable based on rules or other criteria to provide desired information to a user (e.g., identified groups, data quality values, rule information, fields, data, etc.).

The present invention embodiments are not limited to the specific tasks or algorithms described above, but may be utilized for determining the data quality of any type of information from any data source for any type of cleansing or other process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for controlling cleansing of data within a database system comprising:
   receiving a data set at a processor from the database system;
   sorting data of the data set and arranging the data with similar content adjacent each other;
   partitioning the sorted data into data groups of fixed size;
   selecting, via the processor, one or more features of at least one of the data groups and determining values for one or more characteristics of the selected features;
   applying the determined values to a data quality estimation model, via the processor, to determine data quality estimates for the at least one data group, wherein the data quality estimation model comprises a regression model utilizing a plurality of metafeatures of the data to determine the data quality estimates;
   identifying, via the processor, at least one data group within the data set based on the data quality estimates which is incomplete, incorrect and/or inconsistent; and
   adjusting the cleansing, via the processor, to accommodate the identified data group,
   wherein the applying the determined values further includes:
   applying the determined values associated with corresponding data fields of the data set to the data quality estimation model to determine data quality estimates for each field;
   wherein the identifying data further includes:
   identifying one or more data fields based on the data quality estimates for each data field, wherein the identified data fields include data quality estimates with the lowest values.

2. The computer-implemented method of claim 1, wherein the partitioning further includes:
   partitioning the data set into the data groups with each group including data of a similar data quality.

3. The computer-implemented method of claim 2, wherein the applying the determined values further includes:
   applying the determined values associated with each group to the data quality estimation model to determine data quality estimates for each group.

4. The computer-implemented method of claim 3, wherein the identifying data further includes:
   identifying one or more data groups based on the data quality estimates for each group, wherein the identified groups include data quality estimates with the lowest values.

5. The computer-implemented method of claim 1, wherein the cleansing is performed in accordance with one or more rules, and the adjusting the cleansing further includes at least one of:
   modifying the one or more rules for the cleansing to accommodate the identified data; and
   creating one or more new rules for the cleansing to accommodate the identified data.

6. The computer-implemented method of claim 1, wherein the cleansing includes matching and linking phases to identify duplicate data, and the computer-implemented method further includes:
   removing, via the processor, the identified data from the matching and linking phases to enhance the identification of duplicate data.

7. The computer-implemented method of claim 1, wherein the plurality of metafeatures comprises one or more of mean length, standard deviation of length, skewness of length or kurtosis of length of a data item of the data.

8. A system for controlling cleansing of data within a database system comprising:
   a computer system including at least one processor configured to:
   receive a data set from the database system;
   sort data of the data set and arrange the data with similar content adjacent each other;
   partition the sorted data into data groups of fixed size;
   select one or more features of at least one of the data groups and determining values for one or more characteristics of the selected features;
   apply the determined values to a data quality estimation model to determine data quality estimates for the at least one data group, wherein the data quality estimation model comprises a regression model utilizing a plurality of meta features of the data to determine the data quality estimates;
   identify at least one data group within the data set based on the data quality estimates which is incomplete, incorrect and/or inconsistent; and
   adjust the cleansing to accommodate the identified data group,
   wherein the applying the determined values further includes:

applying the determined values associated with corresponding data fields of the data set to the data quality estimation model to determine data quality estimates for each field;

wherein the identifying data further includes:
identifying one or more data fields based on the data quality estimates for each data field, wherein the identified data fields include data quality estimates with the lowest values.

9. The system of claim 8, wherein the partitioning further includes:
partitioning the data set into the data groups with each group including data of a similar data quality.

10. The system of claim 9, wherein the applying the determined values further includes:
applying the determined values associated with each group to the data quality estimation model to determine data quality estimates for each group.

11. The system of claim 10, wherein the identifying data further includes:
identifying one or more data groups based on the data quality estimates for each group, wherein the identified groups include data quality estimates with the lowest values.

12. The system of claim 8, wherein the cleansing is performed in accordance with one or more rules, and the adjusting the cleansing further includes at least one of:
modifying the one or more rules for the cleansing to accommodate the identified data; and
creating one or more new rules for the cleansing to accommodate the identified data.

13. The system of claim 8, wherein the cleansing includes matching and linking phases to identify duplicate data, and the computer-implemented method further includes:
removing, via the processor, the identified data from the matching and linking phases to enhance the identification of duplicate data.

14. The system of claim 8, Wherein the plurality of metafeatures comprises one or more of mean length, standard deviation of length, skewness of length or kurtosis of length of a data item of the data.

15. A computer program product for controlling cleansing of data within a database system comprising:
a computer readable storage medium having computer readable program code embodied therewith, the computer readable program code comprising computer readable program code configured to:
receive a data set from the database system;
sort data of the data set and arrange the data with similar content adjacent each other;
partition the sorted data into data groups of fixed size;
select one or more features of at least one of the data groups and determining values for one or more characteristics of the selected features;
apply the determined values to a data quality estimation model to determine data quality estimates for the at least one data group, wherein the data quality estimation model comprises a regression model utilizing a plurality of metafeatures of the data to determine the data quality estimates;
identify at least one data group within the data set based on the data quality estimates which is incomplete, incorrect and/or inconsistent; and
adjust the cleansing to accommodate the identified data group,
wherein the applying the determined values further includes:
applying the determined values associated with corresponding data fields of the data set to the data quality estimation model to determine data quality estimates for each field;
wherein the identifying data further includes:
identifying one or more data fields based on the data quality estimates for each data field, wherein the identified data fields include data quality estimates with the lowest values.

16. The computer program product of claim 15, wherein the partitioning further includes:
partitioning the data set into the data groups with each group including data of a similar data quality.

17. The computer program product of claim 16, wherein the applying the determined values further includes:
applying the determined values associated with each group to the data quality estimation model to determine data quality estimates for each group.

18. The computer program product of claim 17, wherein the identifying data further includes:
identifying one or more data groups based on the data quality estimates for each group, wherein the identified groups include data quality estimates with the lowest values.

19. The computer program product of claim 15, wherein the cleansing is performed in accordance with one or more rules, and the adjusting the cleansing further includes at least one of:
modifying the one or more rules for the cleansing to accommodate the identified data; and
creating one or more new rules for the cleansing to accommodate the identified data.

20. The computer program product of claim 15, wherein the cleansing includes matching and linking phases to identify duplicate data, and the computer-implemented method further includes:
removing, via the processor, the identified data from the matching and linking phases to enhance the identification of duplicate data.

* * * * *